Figure 1:
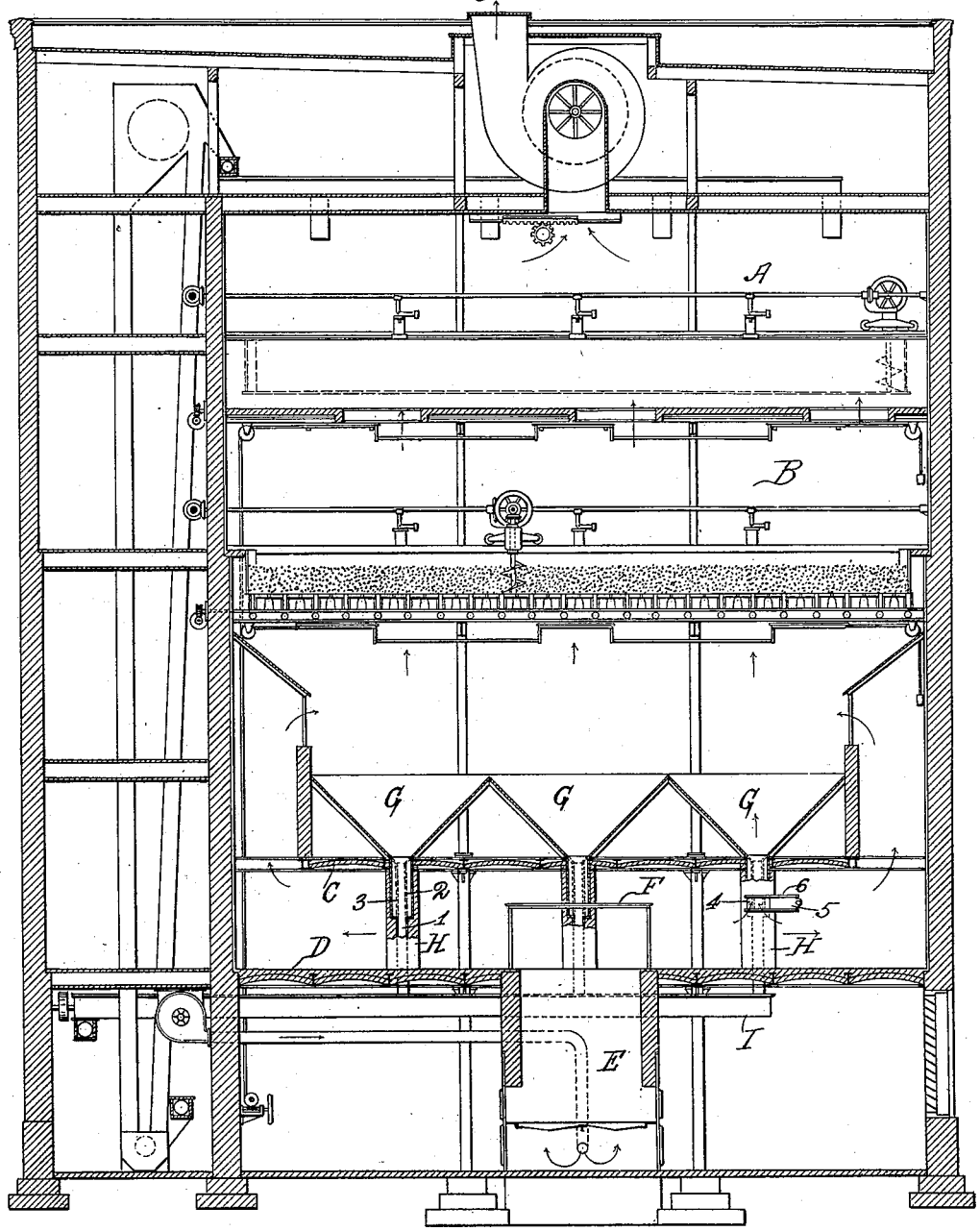

(No Model.) 2 Sheets—Sheet 1.
W. H. PRINZ.
APPARATUS FOR DRYING MALT.

No. 601,044. Patented Mar. 22, 1898.

(No Model.) 2 Sheets—Sheet 2.
W. H. PRINZ.
APPARATUS FOR DRYING MALT.
No. 601,044. Patented Mar. 22, 1898.
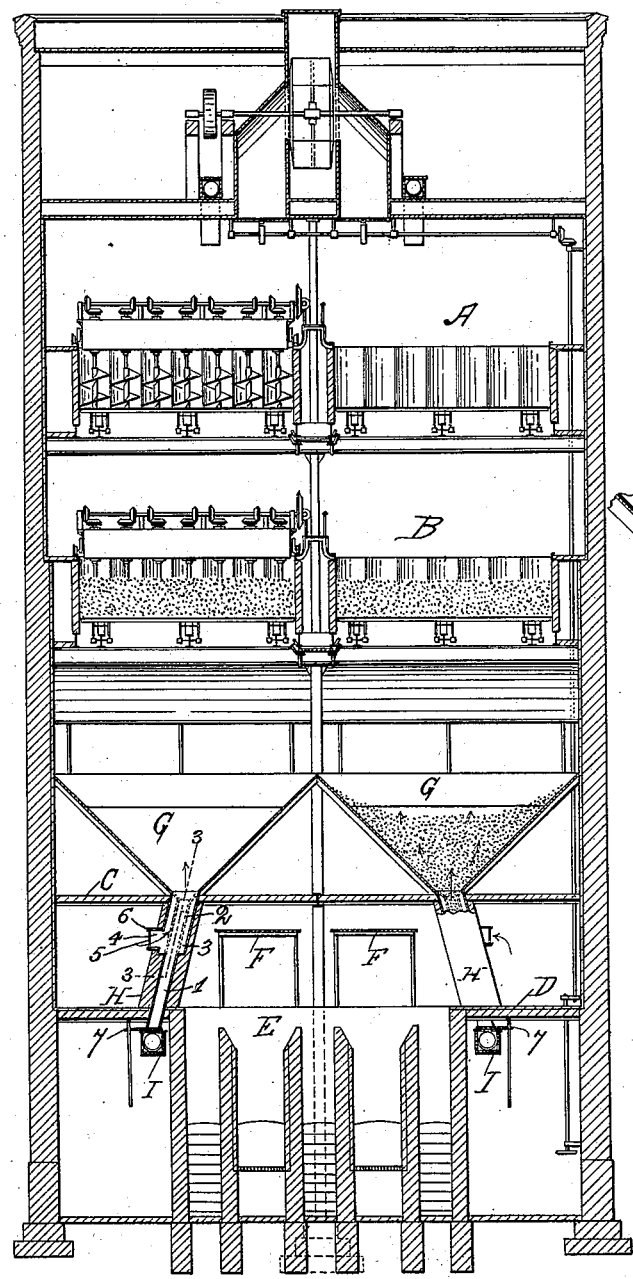
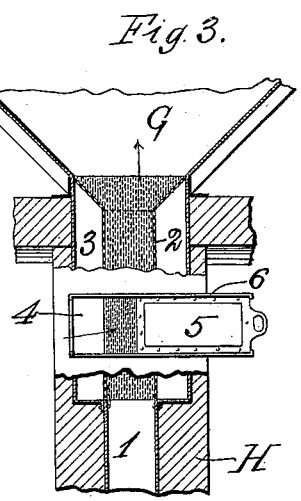
Witnesses:
Inventor:
William H. Prinz.
By Rudolph Wm. Lotz.
Att'y

UNITED STATES PATENT OFFICE.

WILLIAM H. PRINZ, OF AUSTIN, ILLINOIS, ASSIGNOR TO THE SALADIN PNEUMATIC MALTING CONSTRUCTION COMPANY, OF CHICAGO, ILLINOIS.

APPARATUS FOR DRYING MALT.

SPECIFICATION forming part of Letters Patent No. 601,044, dated March 22, 1898.

Application filed April 29, 1897. Serial No. 634,322. (No model.)

*To all whom it may concern:*

Be it known that I, WILLIAM H. PRINZ, a citizen of the United States, residing at Austin, in the county of Cook and State of Illinois, have invented certain new and useful Improvements in Apparatus for Drying Malt; and I do hereby declare the following to be a full, clear, and exact description of the invention, such as will enable others skilled in the art to which it appertains to make and use the same.

My invention relates to a novel construction in an apparatus for drying malt, the object being to provide a device of this character in which the dried malt is cooled after it has been removed from the drying-floor by means of air passing therethrough, which, becoming heated, is utilized to dry the undried malt introduced into the drier immediately after the discharge of a layer of finished malt.

My invention consists in the features of construction hereinafter fully described and claimed.

In the accompanying drawings, illustrating my invention, Figure 1 is a vertical longitudinal section of a malt-house constructed in accordance with my invention. Fig. 2 is a vertical transverse section of the same. Fig. 3 is a detail sectional view, partly in elevation, on an enlarged scale, on the line 3 3 of Fig. 2.

In the accompanying drawings I have shown an apparatus for drying malt provided with two drying-floors A and B and a hopper-floor C below the same. Below said hopper-floor C is an ash-floor D, on a level with the upper or outlet end of the furnace E, above which is a hood F. On said hopper-floor are a plurality of hoppers G, adapted to receive the finished malt from the floor B, and these are connected by means of spouts H with conveyers I, leading to a storage-chamber.

The green malt from the malt-house is first introduced upon the floor A, where it undergoes the first stage of the drying process, and after it has reached a certain degree of dryness it is dumped upon the floor B, where it undergoes the final stage and becomes finished malt. From said floor B said malt is dumped into the hoppers G, and, having been subjected to a high temperature during the final stage of drying, it is very hot when dumped into said hoppers. In said hoppers said malt is allowed to cool, and to expedite the cooling and at the same time utilize the heat stored in said malt I have provided means for passing cool air through the same while in said hoppers, which while passing therethrough becomes heated and passes thence through the unfinished malt on said floors A and B and facilitates the drying on said floors. During such time the fire in the furnace E is kept low, so as not to heat the air to the usual degree and to permit it to pass through said malt in said hopper at a lower temperature than that of the malt. To this end I have provided central passages 1 in said spouts H, the upper portions 2 of which are perforated. Around said perforated portions 2 are free-air spaces or flues 3, which communicate with the flue formed between the hopper-floor C and ash-floor D by means of openings 4, adapted to be closed by means of sliding dampers 5, mounted in guides 6 around said openings 4. Adjacent said conveyers I valves 7 are interposed in said spouts H to control the passage of the malt into said conveyers. Immediately after the finished malt has been dumped into said hoppers G said dampers 5 are opened and cool air permitted to enter said flues 3, whence it passes through the perforated portions 2 of said passages 1, and thus upwardly through the malt. During its passage through the malt said air obviously cools the malt and is heated thereby and passes thence through the malt on the floors B and A, respectively, thus obviously aiding the drying of said malt. After said malt in said hopper G has been sufficiently cooled the dampers 5 are closed and the valves 7 opened, thus permitting the malt to pass into said conveyers I, whence it is conveyed to the storage-chamber.

By means of the above construction I obviously effect an economy of fuel and saving of time in cooling the finished malt.

I claim as my invention—

1. In an apparatus for drying malt, drying-floors, receptacles below said drying-floors to receive finished malt, a heating-chamber below said receptacles, and valve-controlled air-passages establishing communication between said receptacles and said heating-chamber, whereby prepared air is permitted to pass through the malt in said receptacles to cool the same.

2. In an apparatus for drying malt, drying-floors, hoppers below said drying-floors for receiving finished malt, a heating-chamber below said hoppers, downwardly-extending spouts connecting said hoppers with conveyers, and perforations in said spouts establishing communication between said hoppers and said heating-chamber, whereby prepared air is permitted to pass through said malt in said hoppers to cool the same.

3. In an apparatus for drying malt, drying-floors, hoppers below said drying-floors for receiving finished malt, spouts connecting said hoppers with conveyers, central passages in said spouts perforated at their upper ends, and an air-space around said perforated portions of said central passages, whereby air is permitted to pass through said malt to cool the same.

4. In an apparatus for drying malt, drying-floors, hoppers below said drying-floors for receiving finished malt, spouts connecting said hoppers with conveyers, central passages in said spouts perforated at their upper ends, an air-space around said perforated portions of said central passages, and valve-controlled openings controlling said air-spaces.

In testimony whereof I affix my signature in presence of two witnesses.

WILLIAM H. PRINZ.

Witnesses:
RUDOLPH WM. LOTZ,
ERWIN J. LOTZ.